United States Patent [19]

Townsend

[11] Patent Number: 5,364,712
[45] Date of Patent: Nov. 15, 1994

[54] DUAL POROSITY GAS EVOLVING ELECTRODE

[75] Inventor: Carl W. Townsend, Los Angeles, Calif.

[73] Assignee: Hughes Aircraft Company, Los Angeles, Calif.

[21] Appl. No.: 173,721

[22] Filed: Dec. 23, 1993

Related U.S. Application Data

[63] Continuation of Ser. No. 839,521, Feb. 21, 1992, abandoned.

[51] Int. Cl.$^5$ .............................................. H01M 4/02
[52] U.S. Cl. ..................................... 429/42; 429/44; 502/101
[58] Field of Search ...................... 429/42, 44; 502/101

[56] References Cited

U.S. PATENT DOCUMENTS

| | | | |
|---|---|---|---|
| 4,197,367 | 4/1980 | Deborski | 429/223 |
| 4,444,852 | 4/1984 | Liu et al. | 429/29 |
| 4,446,210 | 5/1984 | Okada et al. | 429/42 |
| 4,738,904 | 4/1988 | Ludwig et al. | |
| 4,931,168 | 6/1990 | Watanabe et al. | 204/284 |
| 4,992,341 | 2/1991 | Smith et al. | 429/40 |

FOREIGN PATENT DOCUMENTS

| | | |
|---|---|---|
| 524679 | 9/1981 | Australia . |
| 2195849 | 3/1974 | France . |

*Primary Examiner*—Prince Willis, Jr.
*Assistant Examiner*—M. Nuzzolillo
*Attorney, Agent, or Firm*—M. E. Lachman; M. W. Sales; W. K. Denson-Low

[57] ABSTRACT

A dual porosity electrode for use in thermoelectrochemical systems where simultaneous transport of gas and liquid into and/or out of the electrode is required. The electrode includes catalytic electrode particles having diameters ranging from about 25 to 100 angstroms. The catalytic electrode particles are anchored to a support network in clusters which have internal pores ranging in size from 25 to 100 angstroms. The pores between the clusters range in size from between about 1 to 20 microns. A method for making the dual porosity electrodes is also disclosed.

17 Claims, No Drawings

DUAL POROSITY GAS EVOLVING ELECTRODE

This invention was made with United States Government support under Contract No. DE-AC02-89CH10405 awarded by the Department of Energy. The United States Government has certain rights to this invention.

This is a continuation of application Ser. No. 07/839,521 filed Feb. 21, 1992, now abandoned.

BACKGROUND OF THE INVENTION

1. Field of the Invention

The present invention relates generally to electrochemical cells. More specifically, the present invention relates to an improved dual porosity electrode for use in electrochemical systems wherein simultaneous transport of gas and liquid into and/or out of the electrode is required.

2. Description of the Related Art

U.S. Pat. No. 4,738,904, issued Apr. 19, 1988, and assigned to the present assignee, discloses a thermoelectrochemical system in which a continuous electrical current is generated from heat input below 250° C. In this system, a hydrogen ion reacting cathode is immersed in a chosen Bronsted acid and a hydrogen ion reacting anode is immersed in a chosen Bronsted base. Reactants consumed at the electrodes during the electrochemical reactions are directly regenerated thermally below about 250° C. and recycled to the electrodes to provide continuous operation of the system. The electrodes used in this type of thermoelectrochemical system are typically composed of platinum or other catalytic particles which are held together by a support network of microscopic hydrophobic fibers made from materials such as polytetrafluoroethylene (PTFE).

In operation of the above thermoelectrochemical system, hydrogen gas reacts with ammonia or an amine vapor in microscopic pores in the anode electrode to generate an electron and an ammonium ion or a protonated amine. The protonated amine ion is transported through a membrane in the cell to the cathode. The protonated amine is transported into the microscopic pores of the cathode which are present between the platinum particles. Within these microscopic pores, a liquid acid and an electron react to produce hydrogen gas and an acid anion. The anion combines with the protonated amine ion to form a liquid salt. For the cathode to operate effectively, fresh acid must enter the electrode structure while simultaneously allowing the hydrogen gas and the salt to escape from the structure. Accordingly, it would be desirable to provide an electrode which is designed to allow simultaneous transport of gas and liquid into and/or out of the electrode in an efficient manner to improve performance of thermoelectrochemical systems of the type described in the above-mentioned patent.

SUMMARY OF THE INVENTION

In accordance with the present invention, it was discovered that performance of thermoelectrochemical systems can be improved by providing a dual porosity electrode which is designed to enhance escape of gas from the electrode while simultaneously allowing adequate transport of liquid into intimate contact with the catalytic particles of the cathode. The ability of the dual porosity electrode to provide simultaneous transport of gas and liquid into and/or out of the electrode results in reduced electrode polarization and increased power output compared with prior systems utilizing electrodes having uniform porosities.

The dual porosity electrode in accordance with the present invention includes catalytic electrode particles having diameters ranging from about 25 to 100 angstroms. These catalytic electrode particles are anchored within a support network to form clusters of catalytic particles wherein the pores between the catalytic particles range in size from about 25 to 100 angstroms. As a feature of the present invention, pores ranging in size from about 1 to 20 micrometers (microns) are provided between the clusters of catalytic electrode particles. It was discovered that the small pores located within the clusters of catalytic particles allow liquid reactants to intimately contact the catalytic particles while at the same time, the larger pore sizes allow gas generated during operation of the thermochemical system to escape readily from the electrode.

As another feature of the present invention, a process is disclosed for making the dual porosity electrode. The process involves mixing the catalytic electrode particles with leachable pore-forming particles which range in size from about 1 to 20 microns. A network-forming material is added to this mixture to form a mixture of the catalytic particles and the network-forming material. This mixture is then treated to form a support network in which clusters of the catalytic electrode particles are anchored with the leachable pore-forming particles being interspersed between the clusters. The leachable pore-forming particles are then selectively removed to provide a dual porosity electrode wherein the pores within the clusters of catalytic particles range in size from about 25 to 100 angstroms and wherein the pores between the clusters of catalytic electrode particles range in size from about 1 to 20 microns.

As a feature of the present invention, platinized carbon or graphite particles may be used as the catalytic electrode particles to reduce the amount of platinum required. Platinum loadings on the order of 0.05 mg/cm$^2$ are possible. When platinized particles are used, it is preferred that platinization be conducted after the support network has been formed. In this particular procedure, the pore-forming particles are selectively removed after the platinizing step in which the carbon or graphite particles are platinized.

The above-discussed features and attendant advantages of the present invention will become better understood by reference to the following detailed description.

DETAILED DESCRIPTION OF THE INVENTION

The present invention is an improved electrode which is adapted for use in thermoelectrochemical systems of the type disclosed in U. S. Pat. No. 4,738,904. The contents of this patent are hereby incorporated by reference. Although the dual porosity electrode in accordance with the present invention is especially well-suited for use with thermoelectrochemical systems, the invention also may be used in a wide variety of electrochemical cells and systems wherein it is required that both gas and liquid be simultaneously transported into and/or out of the electrode. Accordingly, it will be recognized by those skilled in the art that the dual porosity electrode of the present invention is not limited for use in thermoelectrochemical systems, but may be used in a wide variety of electrochemical cells.

The dual porosity electrode in accordance with the present invention includes catalytic electrode particles which are anchored as clusters within a support network. The catalytic electrode particles have diameters ranging from about 25 to 100 angstroms. Suitable catalytic particles include platinum, palladium, nickel boride, tungsten carbide, silver, platinized carbon black or graphite and any other of the known materials which are used as electrode particles. Platinum and platinized carbon black are preferred electrode materials. These materials are available commercially in particle form and are conventionally identified as fuel cell grade particles.

The support network to which the catalytic particles are clustered is preferably a hydrophobic material such as polytetrafluoroethylene (PTFE) or paraffin. Other support network materials may be used provided that they have similar hydrophobic properties and are capable of anchoring the catalytic particles in a manner similar to PTFE or paraffin. PTFE is the preferred support network material. The PTFE is preferably in the form of an aqueous dispersion of angstrom-sized particles. Such aqueous dispersions of Teflon are available from E. I. DuPont de Nemours, with the preferred aqueous dispersion being identified as Teflon® 30 Aqueous Dispersion. Such aqueous dispersions of Teflon® have been used in combination with electrode grade platinum particles and other catalytic particles to form single porosity electrodes.

In accordance with the present invention, the support network anchors the catalytic particles in a manner which forms clusters of particles. The pores located inside of the catalytic particle clusters have sizes ranging from about 25 to 100 angstroms. However, as will be described below, the process by which the electrode is made results in pores located between the clusters which range in size from between about 1 to 20 microns. These two pore size ranges result in the formation of a dual porosity electrode which has the previously mentioned advantage of allowing simultaneous transport of gas and liquid into and/or out of the electrode.

The process by which the dual porosity electrode in accordance with the present invention is made follows the same basic procedures utilized for forming other single porosity electrodes made of catalytic particles. In a preferred procedure, the catalytic particles are intimately mixed with leachable pore-forming particles. These leachable pore-forming particles have a particle size of about 1 to 20 microns, with a range of 1 to 5 microns being preferred. The leachable pore-forming particles can be made from anything which is leachable from the completed electrode without damaging or otherwise adversely affecting the remaining catalytic particles and support structure material. Zinc particles are particularly preferred since they may be easily leached from the resulting structure using acid. Other suitable materials for use as the pore-forming particles include other metals, metal hydroxides, metal carbonates, and water soluble substances which are resistant to high temperature, such as a variety of salts.

The mixture of catalytic particles and pore-forming particles are further mixed with the network-forming material to form an aqueous suspension or slurry. In accordance with conventional procedures, the slurry is spread out over a support substrate, such as aluminum foil, and dried. The mixture is then sintered to form the support network structure in which the relatively small catalytic particles are anchored as clusters with the leachable pore-forming particles being dispersed therebetween. After the sintering or bonding step, the pore-forming particles are then leached out of the electrode using a suitable solvent. The resulting electrode is a dual porosity electrode in which very small pores on the order of 25 to 100 angstroms are present within the remaining clusters of catalytic particles. The pore sizes between the clusters is on the order of 1 to 20 microns.

As will be described in detail in the following examples, the dual pore structure of the electrodes in accordance with the present invention provides optimum catalytic particle contact with liquids being transported into the electrode while at the same time allowing relatively rapid escape of gas generated within the electrode structure.

When dual porosity electrodes utilizing platinized carbon or graphite are used, the platinizing of these particles can be accomplished prior to or after formation of the electrode. For example, the carbon black particles are mixed with the pore-forming material and support structure material and sintered. Prior to leaching of the pore-forming material from the resulting sintered body, the carbon black particles are platinized according to conventional procedures. The pore-forming particles are then leached from the resulting platinized electrode. Although the carbon black may be platinized prior to sintering when it is used in place of platinum, it is preferred that the platinization step take place after sintering but prior to leaching of the pore-forming material from the electrode.

Examples of practice of the present invention are presented below.

EXAMPLE 1

A preferred dual porosity cathode in accordance with the present invention was produced as follows using platinum as the catalytic particles:

1. 7.1 mg platinum black Englehard (50–100 angstroms particle size), and 10 mg of zinc (1–5 micron particle size) were intimately mixed. The platinum black was obtained from Englehard (Seneca, S.C.) and the zinc dust was obtained from Mallinkrodkt (St. Louis, Mo.).
2. A quantity of Teflon 30 Aqueous Dispersion (DuPont) was diluted to 10% by volume with water. Two drops of this solution (4.5 mg Teflon) were added to the above mixture and slurried together.
3. The slurry was spread out over a circle of aluminum foil which was 1.55 cm in diameter (1.88 cm$^2$) and dried in an oven at 110° C. for 2 minutes.
4. The dried mixture was sintered in nitrogen at 350° C. for 10 minutes.

The resulting cathode was bonded to a cation exchange membrane (type R1010, supplied by RAI, Inc., Hauppauge, N.Y.) together with a fuel cell anode (Ergenics, Inc., Wyckoff, N.J.) by hot pressing. After bonding, the aluminum foil was carefully peeled away. The zinc dust was then leached out of the cathode using a mixture of 50% concentrated HCl and 50% isopropanol. The resulting cathode structure hence consisted of agglomerated platinum particles anchored to a PTFE support network. The pores within the clusters are in the range of 50 to 100 angstroms and the interspersed pores between the cluster are micron sized, on the order of 1 to 5 microns.

EXAMPLE 2

A dual porosity cathode utilizing platinized carbon as the catalytic particles was produced as follows:

1. 2.3 mg Black Pearls 2000 Carbon Black (Cabot Corp., Boston, Mass.) and 9.3 mg of zinc dust (Mallinkrodkt, 1-5 microns particle size) were intimately mixed.
2. Two drops of 10% Teflon 30 solution were added to the mixture and slurried together.
3. The slurry was spread out over a circle of aluminum foil which was 1.55 cm in diameter (1.88 cm$^2$) and dried in an oven at 110° C. for 2 minutes
4. The dried mixture was sintered in nitrogen at 350° C. for 10 minutes.

The resulting cathode was bonded to a cation exchange membrane (type R1010) with a fuel cell anode (Ergenics, Inc.) by hot pressing. After bonding, the aluminum foil was carefully peeled away. Platinum was added to the cathode by adding two drops of the following mixture:

4 gm/liter Pt as $H_2PtCl_6$
4 ml/liter HCl
25 mg/liter $Pb(CH_3COO)_2$
500 ml/liter isopropanol As this solution soaked into the electrode, the platinum was reduced by chemical displacement with the zinc dust. This resulted in a platinum loading of 0.1 mg/cm$^2$. After platinizing, the residual zinc was dissolved in 50%-50% HCl-isopropanol mixture. The resulting cathode was composed of agglomerated platinized carbon particles interspersed with micron-sized pores.

EXAMPLE 3

A standard fuel cell electrode was obtained from Prototech, Inc. now called E-TEK (Framingham, Mass.). The formulation of this electrode is similar to that in Example 2, except it does not contain dual porosity and is included here for reference purposes. This cathode was bonded to a cation exchange membrane (Type R1010).

EXAMPLE 4

A cathode was made using the process described in Example 1 except that the zinc was omitted. As a result, the cathode did not contain dual porosity and is included here for reference purposes. The cathode was bonded to a cation exchange membrane.

EXAMPLE 5

The electrodes described in Examples 1-4 were tested in a test loop based upon the thermoelectrochemical system described in U.S. Pat. No. 4,738,904. The thermal regeneration loop for regenerating the electrolytes included two storage tanks, connected by tubing to the electrode cell via circulating pumps. A line connected the two sides of the cell to transport hydrogen from the cathode to the anode. Pressure gauges and thermocouples were attached to monitor the system.

Cell tests were conducted such that the base pump bubbled hydrogen saturated with ammonia or amine and water vapor. This gas mixture was then circulated through the cell anode.

To begin a test, the electrochemical apparatus was evacuated by means of a rotary pump. Then the line to the pump was closed and the vacuum used to draw the acid and base solutions into their respective storage tanks. Next, hydrogen was introduced into the system, and the pumps were started. Polarization measurements (current versus voltage) were then conducted on the electrochemical cell. A silver-chloride reference electrode was used to separate the polarization contributions of the cathode and anode. Ohmic losses in the cell were monitored by current interruption.

Table 1 shows comparative results of the cathodes when tested with lactic acid and ammonia as the electrolytes.

TABLE 1

Cell Tests for Lactic Acid-Ammonia

| * | Cathode | Open Circuit Voltage (mV) | Max. Power (mW/cm$^2$) | Cathode Polarization (ohm-cm$^2$) |
|---|---|---|---|---|
| 1 | Platinum-Zinc (Dual porosity) | 250 | 12.0 | 0.27 |
| 2 | Carbon-Pt-Zinc (Dual porosity) | 225 | 5.42 | 0.90 |
| 3 | Carbon-Platinum (Single Porosity) | 254 | 1.7 | 6.55 |
| 4 | Platinum (Single porosity) | 216 | 4.16 | 3.87 |

*Example number describing cathode.

The results in Table 1 show that substantially enhanced performance results when dual porosity in accordance with the present invention is incorporated into the cathode. The results also show that the difference in performance results from the morphology of the structure, and not from substitution of platinum for carbon.

While not limiting the present invention to a particular theory of operation, it is believed that the enhanced performance of the dual porosity electrodes results from two mechanisms. First, the capillary forces inside the electrode depend on the size of pores. Small pores will retain liquid unless forced out by very high pressure. This high pressure then prevents any fresh liquid from entering the electrode. Large pores, however, can be flushed out easily. The gas produced in the electrode preferentially exits via the large holes, leaving the small holes liquid-filled. Additionally, the larger pores allow gas to escape through bulk diffusional processes. Small pores, however, allow gas to escape only by Knudsen diffusion, a much slower process.

It should be noted by those skilled in the art that the formulations in the above examples are representative only and that various proportions and distributions of pore sizes will also allow improved operation. Also, it is contemplated that the process will be effective for gases other than hydrogen, processes other than the operation of thermoelectrochemical systems, and will be effective for use in gas-evolving anodes as well as cathodes. The electrodes of a chlor-alkali cell, for example, which evolve chlorine at the anode and hydrogen at the cathode, would both benefit from the dual porosity structure of the present invention.

Also, the dual porosity electrode in accordance with the present invention works for applications where dual porosity is not necessary. Tests of this electrode as anodes in thermoelectrochemical cells, for example, give results similar to fuel cell anodes. This versatility allows standardization of the process for large scale production of both anodes and cathodes without the necessity of producing different formulations for each application.

Accordingly, the present invention is not limited by the above disclosure, but is only limited by the following claims.

What is claimed is:

1. A dual porosity electrode adapted for use in a thermoelectrochemical system wherein simultaneous transport of gas and liquid into and/or out of said electrode is required, said electrode consisting of:
    catalytic electrode particles having diameters ranging from about 25 to 100 angstroms; and
    a support network consisting of a hydrophobic material for anchoring said catalytic particles to form clusters of catalytic particles wherein the pores between said catalytic particles range in size from about 25 to 100 angstroms and allow said transport of said liquid therethrough and wherein the pores between said clusters range in size from between about 1 to 20 microns and allow said transport of said gas therethrough.

2. A dual porosity electrode according to claim 1 wherein said hydrophobic material is selected from the group consisting of polytetrafluoroethylene and paraffin.

3. A dual porosity electrode according to claim 1 wherein said catalytic electrode particles comprise a catalytic material selected from the group consisting of platinum, palladium, nickel boride, tungsten carbide, silver, platinized carbon black and platinized graphite.

4. A dual porosity electrode according to claim 3 wherein said catalytic electrode particles comprise platinum.

5. A dual porosity electrode according to claim 4 wherein said support network comprises polytetrafluoroethylene.

6. A dual porosity electrode according to claim 3 wherein said catalytic electrode particles comprise platinized carbon black.

7. A dual porosity electrode according to claim 6 wherein said support network comprises polytetrafluoroethylene.

8. A dual porosity electrode according to claim 1 wherein said pores between said catalytic electrode particles range in size from about 25 to 100 angstroms and the size of said pores between said clusters ranges from about 1 to 5 microns.

9. A dual porosity electrode for use in a thermoelectrochemical system wherein simultaneous transport of gas and liquid into and/or out of said electrode is required, said electrode being made by the steps consisting of:
    mixing catalytic electrode particles which range in size from between about 25 to 100 angstroms with leachable pore-forming particles which range in size from about 1 to 20 microns and a network-forming material consisting of a hydrophobic material to form a mixture of said catalytic electrode particles, said pore-forming particles and said network-forming material;
    treating said mixture at a sufficient temperature and for a sufficient time to form a support network to which clusters of said catalytic electrode particles are anchored and wherein said leachable pore-forming particles are interspersed between said clusters anchored to said support network; and
    selectively removing said pore-forming particles from said support network wherein the pores within said clusters of catalytic electrode particles range in size from about 25 to 100 angstroms and allow said transport of said liquid therethrough and wherein the pores between said clusters range in size from about 1 to 20 microns and allow said transport of said gas therethrough.

10. A dual porosity electrode made according to the process of claim 9 wherein said hydrophobic material is selected from the group consisting of polytetrafluoroethylene and paraffin.

11. A dual porosity electrode made according to the process of claim 9 wherein said catalytic electrode particles comprise a catalytic material selected from the group consisting of platinum, palladium, nickel boride, tungsten carbide, silver, platinized carbon black and platinized graphite.

12. A dual porosity electrode made according to the process of claim 11 wherein said catalytic electrode particles comprise platinum.

13. A dual porosity electrode made according to the process of claim 12 wherein said support network comprises polytetrafluoroethylene.

14. A dual porosity electrode made according to the process of claim 11 wherein said catalytic electrode particles comprise platinized carbon black.

15. A dual porosity electrode made according to the process or claim 14 wherein said support network is comprised of polytetrafluoroethylene.

16. A dual porosity electrode made according to the process of claim 10 wherein said pores between said catalytic particles range in size from about 25 to 100 angstroms and the size of said pores between said clusters ranges from about 1 to 5 microns.

17. A method for making a dual porosity electrode for use in a thermoelectrochemical system wherein simultaneous transport of gas and liquid into and/or out of said electrode is required, said method consisting of the steps of:
    mixing catalytic electrode particles which range in size from between about 25 to 100 angstroms with leachable pore-forming particles which range in size from about 1 to 20 microns to form a mixture of said catalytic electrode particles, said pore-forming particles and said network-forming material;
    treating said mixture at a sufficient temperature and for a sufficient time to form a support network to which clusters of said catalytic electrode particles are anchored and wherein said leachable pore forming particles are interspersed between said clusters anchored to said support network; and
    selectively removing said pore-forming particles from said support network to form a dual porosity electrode material wherein the pores within said clusters of catalytic electrode particles range in size from about 25 to 100 angstroms and allow said transport of said liquid therethrough and wherein the pores between said clusters range in size from about 1 to 20 microns and allow said transport of said gas therethrough.

* * * * *